US00RE43533E

(19) United States
(12) Reissued Patent
Gallagher

(10) Patent Number: US RE43,533 E
(45) Date of Reissued Patent: Jul. 24, 2012

(54) SPACER FRAME FOR AN INSULATING UNIT HAVING STRENGHTENED SIDEWALLS TO RESIST TORSIONAL TWIST

(75) Inventor: Raymond G. Gallagher, Pittsburgh, PA (US)

(73) Assignee: PPG Industries Ohio, Inc, Cleveland, OH (US)

(21) Appl. No.: 09/399,545

(22) Filed: Sep. 20, 1999

Related U.S. Patent Documents

Reissue of:
(64) Patent No.: 5,813,191
Issued: Sep. 29, 1998
Appl. No.: 08/705,481
Filed: Aug. 29, 1996

(51) Int. Cl.
*A47G 1/00* (2006.01)
*E04C 2/54* (2006.01)
*E06B 3/24* (2006.01)
*E06B 3/64* (2006.01)

(52) U.S. Cl. ..... 52/786.13; 52/786.1; 52/204.5; 52/204.595; 52/786.11; 428/34

(58) Field of Classification Search ..... 52/786.13, 52/846, 842, 836, 786.1, 204.5, 204.595, 52/786.11; D25/121; 428/34; 29/897.312, 29/897.33, 897.35
See application file for complete search history.

(56) References Cited

U.S. PATENT DOCUMENTS

D25,412 S * 4/1896 Jones ..... D25/121
1,457,303 A * 6/1923 Higgins ..... 52/842
2,065,378 A * 12/1936 Kling ..... 52/842
2,086,225 A 7/1937 Hiering
2,097,927 A 11/1937 Klemp
2,831,244 A 4/1958 Adell
D205,824 S * 9/1966 Smith ..... D20/44
3,327,766 A * 6/1967 Kurz ..... 160/381
3,345,791 A 10/1967 Shinefeld
3,389,522 A * 6/1968 Hordis ..... 52/204.599
3,565,264 A * 2/1971 Guiher ..... 211/117
3,877,275 A 4/1975 Attwood
4,057,945 A 11/1977 Kessler
(Continued)

FOREIGN PATENT DOCUMENTS

DE 3203808 8/1983
(Continued)

OTHER PUBLICATIONS

Advertisement from Lockformer Company (no. date).
(Continued)

*Primary Examiner* — Robert Canfield
(74) *Attorney, Agent, or Firm* — Andrew C. Siminerio

(57) ABSTRACT

A spacer stock has a pair of outer legs joined by a base to provide the spacer stock with a generally U-shaped cross section. The outer legs are formed e.g. each leg has a pair of members having a hairpin cross section to reduce the degree of torsional twist of the spacer stock and/or spacer frame with the legs preferably only connected by the base having only one thermal conducting path e.g. through the base from one leg to the other leg. The spacer stock may be shaped or sections of spacer stock joined to provide a spacer frame. The spacer frame may be used to fabricate a multi-sheet glazing unit e.g. by securing a sheet to each of the outer legs with moisture impervious adhesive or sealant.

17 Claims, 4 Drawing Sheets

U.S. PATENT DOCUMENTS

| | | | | | |
|---|---|---|---|---|---|
| 4,170,460 | A | | 10/1979 | Donley | |
| 4,222,213 | A | | 9/1980 | Kessler | |
| 4,223,499 | A | * | 9/1980 | Schrunk | 52/308 |
| 4,239,816 | A | | 12/1980 | Breininger et al. | |
| 4,455,806 | A | * | 6/1984 | Rice | 52/404.1 |
| 4,464,874 | A | * | 8/1984 | Shea et al. | 52/204.593 |
| 4,610,711 | A | | 9/1986 | Matesa et al. | |
| 4,708,554 | A | * | 11/1987 | Howard | 411/84 |
| 4,719,127 | A | | 1/1988 | Greenberg | |
| 4,792,536 | A | | 12/1988 | Pecoraro et al. | |
| 4,806,220 | A | | 2/1989 | Finley | |
| 4,850,175 | A | | 7/1989 | Berdan | |
| 4,853,256 | A | | 8/1989 | Obringer et al. | |
| 4,873,206 | A | | 10/1989 | Jones | |
| 4,969,250 | A | | 11/1990 | Hickman et al. | |
| 5,030,593 | A | | 7/1991 | Heithoff | |
| 5,087,489 | A | | 2/1992 | Lingemann | |
| 5,125,195 | A | | 6/1992 | Brede | |
| 5,240,886 | A | | 8/1993 | Gulotta et al. | |
| 5,295,292 | A | | 3/1994 | Leopold | |
| 5,313,761 | A | | 5/1994 | Leopold | |
| 5,351,451 | A | | 10/1994 | Misera et al. | |
| 5,439,716 | A | | 8/1995 | Larsen | |
| 5,485,710 | A | | 1/1996 | Lafond | |
| 5,491,953 | A | | 2/1996 | Lafond | |
| 5,514,432 | A | * | 5/1996 | Lisec | 428/35.8 |
| 5,531,047 | A | | 7/1996 | Leopold et al. | |
| 5,553,440 | A | | 9/1996 | Bulger et al. | |
| 5,617,699 | A | | 4/1997 | Thompson, Jr. | |
| 5,679,419 | A | * | 10/1997 | Larsen | 428/34 |
| 5,705,010 | A | * | 1/1998 | Larsen | 156/196 |
| 6,038,825 | A | | 3/2000 | Shah et al. | |
| 6,398,260 | B1 | * | 6/2002 | Rinehart | 280/781 |

FOREIGN PATENT DOCUMENTS

| | | | |
|---|---|---|---|
| EP | 0 475 213 | A1 * | 8/1991 |
| EP | 0 553 642 | | 8/1993 |
| GB | 1509178 | | 4/1978 |
| GB | 1585823 | | 5/1978 |

OTHER PUBLICATIONS

"Locked-in Value" brochure; TruSeal Technologies (Mar. 1999). Statement in Information Disclosure Statement.

* cited by examiner

SPACER FRAME FOR AN INSULATING UNIT HAVING STRENGHTENED SIDEWALLS TO RESIST TORSIONAL TWIST

Matter enclosed in heavy brackets [ ] appears in the original patent but forms no part of this reissue specification; matter printed in italics indicates the additions made by reissue.

FIELD OF THE INVENTION

This invention relates to a spacer stock and/or spacer frame and to a multi-sheet glazing unit made using the spacer frame, and, in particular to a spacer frame having strengthened sidewalls to resist torsional twist.

PRESENTLY AVAILABLE TECHNOLOGY AND TECHNICAL PROBLEMS

European Patent Application Publication Number 0 475 213 A1 published Mar. 18, 1992 Bulletin 92/12 (hereinafter "EP Application") based on U.S. patent application Ser. Nos. 578,697; 578,696 and 686,956 filed Sep. 4, 1990; Sep. 4, 1990, and Apr. 18, 1991, respectively (hereinafter the "EP Application") and U.S. Pat. No. 5,531,047 discloses a thermal insulating glazing unit having an edge assembly having low thermal conductivity and a method of making same. In general, the EP Application discloses a thermal insulating glazing unit having a pair of glass sheets about and sealed to an edge assembly to provide a sealed compartment between the sheets, and U.S. Pat. No. 5,531,047 further discloses a glass sheet within the spacer frame of the edge assembly between the sheets. The edge assembly includes a spacer frame having a generally U-shaped cross section having a sealant on each of the outer surfaces of the upright legs, and optionally on the outer surface of the base of the spacer frame and an adhesive bead having desiccant therein adhered to inner surface of the base of the spacer frame.

U.S. Pat. No. 5,313,761 discloses a spacer frame for an insulating unit having a generally U-shaped cross section with portions of the upright legs of the spacer frame bent toward one another over the base of the spacer frame.

Although the design of the spacer frames disclosed in the EP Application and U.S. Pat. Nos. 5,313,761 and 5,531,047 is acceptable, it has limitations. More particularly, the sides of the spacer frame between the corners have incremental torsional twist because the outer legs of the spacer frame are only interconnected by the base. As can be appreciated, as the length of the sides between the corners of the spacer frame increases the degree of twist of the side of the spacer frame between adjacent corners increases.

U.S. patent application Ser. No. 08/529,180 filed on Sep. 15, 1995, in the name of Albert E. Thompson, Jr. discloses a spacer stock and/or spacer frame for use in the manufacture of insulating units that include a generally U-shape cross section and a base having a "T" shaped strengthening member to reduce the degree of rotational twist of the sides of the spacer frame. The strengthening member may be an insert mounted on the base between the upright legs or a strengthening member integral with the spacer stock and/or spacer frame.

Although the use of the insert and/or strengthening member disclosed in U.S. patent application Ser. No. 08/529,180 reduces torsional twist, it has limitations. More particularly, a strengthening member formed integral with the base of the spacer frame requires cutting out portions of the base when the spacer frame is formed from a continuous piece of spacer stock; further, inserts to resist torsional twist require the additional step of mounting the insert in the spacer stock or spacer frame and the carrying an inventory of inserts.

As can be appreciated by those skilled in the art of making multi-sheet glazing units, it would be advantageous to provide a spacer frame design that does not have the limitation of the presently available spacer frames to minimize if not eliminate torsional twist of the sides of the spacer frame.

SUMMARY OF THE INVENTION

This invention relates to spacer stock and/or spacer frame having a base interconnecting a pair of spaced upright legs to provide the spacer stock and/or spacer frame with a generally U-shaped cross section. Each of the uprights legs is formed to minimize if not eliminate torsional twist. In one embodiment of the invention, the upright legs in cross section have a first member and a second member connected to have a hairpin configuration with the first member connected to the base of the spacer frame and the second member having a radius end spaced from the base.

Further, the invention relates to a glazing unit having a pair of sheets spaced from each other by the spacer frame of the instant invention and secured e.g. by a sealant to outer surface of the first member of the legs of the spacer frame.

Still further, the invention relates to a method of making the spacer stock and/or spacer frame of the instant invention and/or of making a multiple glazed unit using the spacer stock and/or spacer frame of the instant invention.

DESCRIPTION OF THE INVENTION

The various embodiments of the spacer stock and/or spacer frame of the instant invention will be discussed in the construction of a glazing unit having a low thermal conducting edge determined using the technique disclosed in the EP Application or in U.S. Pat. No. 5,351,451 which disclosures are hereby incorporated by reference. As will be appreciated, the instant invention is not limited to a multi-sheet glazing unit that is thermally insulating and/or has a low thermal conductive edge, and that the embodiments of the present invention may be used with a multi-sheet glazing unit regardless of its thermal insulating properties, if any. In the following discussion unless otherwise indicated like numerals refer to like elements.

Figure 1:
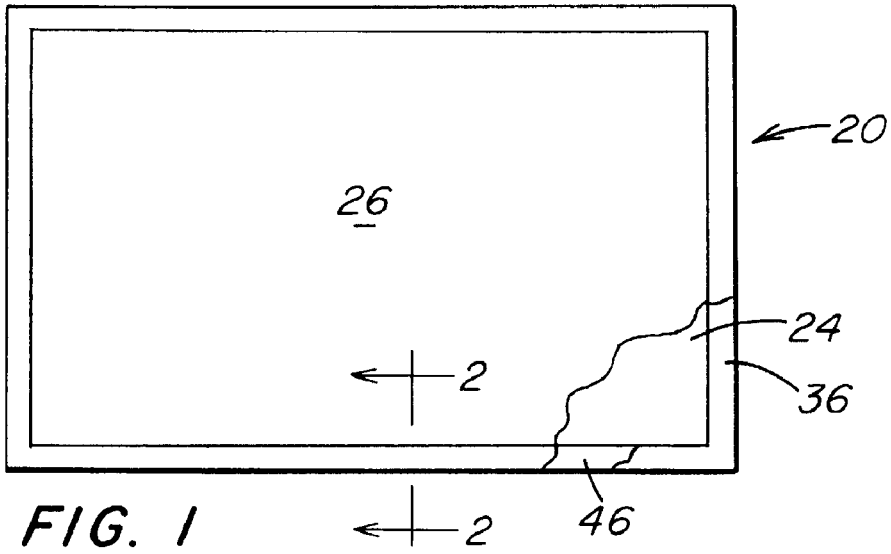
FIG. 1 is a front elevated view of a multi-sheet glazing unit incorporating features of the invention having portions removed for purposes of clarity.
Figure 2:
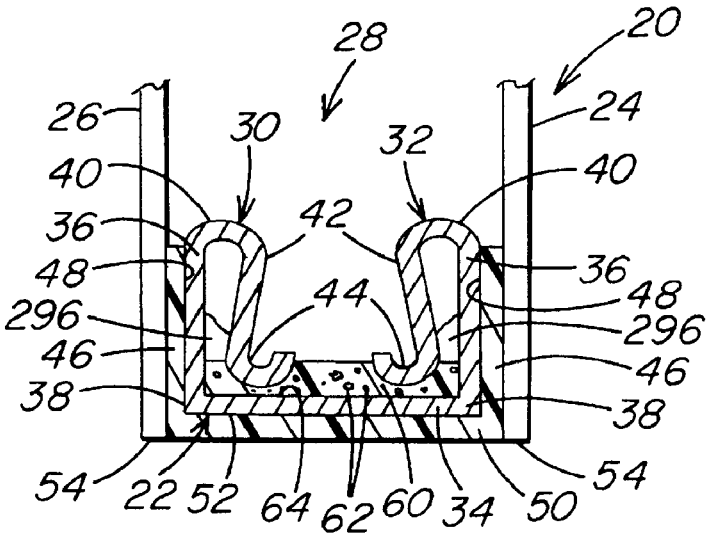
FIG. 2 is the view taken along lines 2-2 of FIG. 1 illustrating an embodiment of a spacer frame of the invention to resist torsional twist.

FIG. 1 illustrates an insulating unit 20, and FIG. 2 illustrates a cross-sectional view of the insulating unit 20 having spacer frame 22 incorporating features of the invention. With specific reference to FIG. 2, the unit 20 includes the spacer frame 22 between and secured to a pair of outer sheets 24 and 26 to provide a compartment 28 therebetween. Preferably but not limiting to the invention, the compartment 28 is sealed against the egress and ingress of gas e.g. air, moisture and/or dust (hereinafter individually and collectively referred to as "environmental air"), and/or the egress of an insulating gas e.g. argon, in a manner discussed below.

In the following discussion, the sheets 24 and 26 are glass sheets; however, as will become apparent, the sheets may be made of any material e.g. glass, plastic, metal and/or wood, and the selection of the materials is not limiting to the invention. Further, the sheets may be all of the same material or the sheets may be of different materials, and still further, one sheet may be a monolithic sheet and the other sheet may be a laminated sheet e.g. made of one or more monolithic sheets laminated together in any usual manner. Still further, one or more of the surfaces of one or more of the sheets may be coated e.g. glass or plastic transparent sheets may have an opaque coating of the type used in making spandrels or, an environmental coating to selectively pass predetermined wavelength ranges of light. U.S. Pat. Nos. 4,610,711; 4,806,220; 4,853,256; 4,170,460; 4,239,816 and 4,719,127 hereby incorporated by reference disclose coated sheets that may be used in the practice of the invention; however, as can be appreciated, the instant invention is not limited thereto. Further, in the practice of the invention, but not limiting thereto, one or more of the glass sheets may be coated and/or uncoated colored sheets for example, but not limiting to the invention, colored sheets of the type disclosed in U.S. Pat. Nos. 4,873,206; 4,792,536; 5,030,593 and 5,240,886 which disclosures are hereby incorporated by reference.

The outer sheets 24 and 26 preferably have the same peripheral configuration and dimensions; however, as can be appreciated, one outer sheet may be larger than the other outer sheet, and one of the sheets may have different peripheral configuration than the other sheet.

With continued reference to FIG. 2, the spacer frame 22 includes a pair of spaced outer legs 30 and 32 secured to a base 34 to provide the spacer frame with a generally U-shaped cross section. Each of the outer legs in cross section as shown in FIG. 2 have a hairpin configuration and include elongated upwardly extending or first member 36 having its bottom portion 38 connected to the base 34 of the spacer frame 22, and upper portion connected at juncture 40 to an elongated downwardly extending or second member 42. The second member 42 has an end portion 44 bent over the base 34 and facing the end portion 44 of the second member 42 of the outer leg 32. In the practice of the invention, it is preferred that the outer legs 30 and 32 be formed from one piece; however, it can be appreciated that the outer legs 30 and 32 may be made from separate pieces joined together to provide the cross sectional shape shown in FIG. 2 for the elongated outer legs 30 and 32.

With continued reference to FIG. 2, a layer 46 of a moisture impervious sealant e.g. an adhesive-sealant material of the type used in the art of making multi-sheet glazing units having sealed compartments is provided on outer surface 48 of the outer legs 30 and 32 of the spacer frame 22 to secure the outer sheets 24 and 26 e.g. marginal edge portions of the sheets to outer surface 48 of the outer legs 30 and 32 respectively of the spacer frame 22 to seal the compartment 28 against movement of environmental air into and out of the compartment 28.

Figure 3:
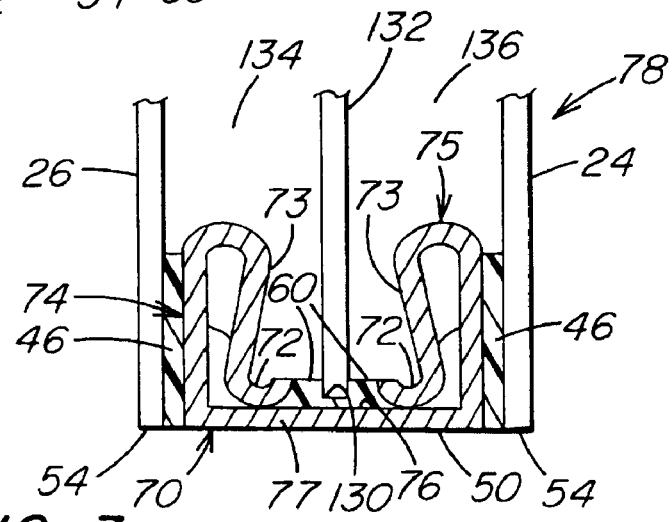
FIG. 3 is a view similar to the view of FIG. 2 having outer layer of sealant on the base of the spacer frame removed showing another embodiment of the spacer frame of the invention to resist torsional twist.

Not limiting to the invention, a layer 50 of a sealant or adhesive-sealant may be provided over outer surface 52 of the base 34 of the spacer frame 22. The layer 50 may be material similar to the material of the layers 46; however, it is preferred that the material of the layer 50 be non-tacky so that the units 20 when stored or shipped on an edge do not stick to the supporting surface. Further, the units having the layer 50, have the spacer frame 22 preferably spaced from peripheral edges 54 of the outer sheets 24 and 26 to provide a channel filled with the layer 50 as shown in FIG. 2. As can now be appreciated by those skilled in the art of making multi-sheet glazing units; the channel having the layer 50 may be eliminated for example, by setting the outer surface 52 of the base 34 of the spacer frame 22 level with the peripheral edges 54 of the sheets 24 and 26 as shown in FIG. 3 or beyond the peripheral edges 54 of the sheets 24 and 26.

As can be appreciated by those skilled in the art, the compartment 28 is usually filled with an insulating gas e.g. Argon, and it is, therefore, recommended that the sealant layer 46 be thin (the thickness of the layer 46 is measured between adjacent major surface of the sheet and the adjacent outer surface of the first member 36) and long (the length of the layer 46 is measured from the peripheral edge 54 of the outer sheets 24 and 26 upward as viewed in FIG. 2 toward the compartment 28) to reduce the diffusion of the insulating gas out of the compartment 28 of the unit 20 or the environmental air moving into the compartment 28 of the unit 20. The material for the layer 46 preferably has a moisture permeability of less than 20 gm mm/$M^2$ day, and more preferably less than 5 gm mm/$M^2$ day, determined using the procedure of ASTM F 372-73. The invention may be practiced with the sealant layer 46 after pressing the sheets against the legs having a thickness of about 0.005 inch (0.013 centimeter (hereinafter "cm")) to about 0.125 inch (0.32 cm), preferably about 0.010 inch (0.025 cm) to about 0.030 inch (0.076 cm) and more preferably about 0.020 inch (0.51 cm). The layer 46 after pressing the sheets against the legs has a length or height as viewed in FIG. 2 of about 0.010 inch (0.025 cm) to about 0.50 inch (1.27 cm), preferably about 0.125 inch (0.32 cm) to about 0.50 inch (1.27 cm) and more preferably about 0.200 inch (0.50 cm). As can now be appreciated and not limiting to the invention, it is preferred that the height of the layer 46 does not exceed the height of the outer legs 30 and 32.

Sealants that may be used in the practice of the invention include but are not limited to butyls, silicones, polyurethane adhesives, room temperature vulcanizable adhesives and preferably butyls and butyl hot melts such as H. B. Fuller 1191, H. B. Fuller 1081A and PPG Industries, Inc. 4442 butyl sealant.

With continued reference to FIG. 2, bead 60 of a pervious material having a desiccant 62 is provided on portions of inner surface 64 of the base 34 of the spacer frame 22. The bead 60 having the desiccant 62 may be of any material known in the art of manufacturing or designing multi-sheet insulating glazing units to absorb moisture in the compartment 28, e.g. moisture captured in the compartment after the outer sheets are secured to the spacer frame. Using a flowable material provides for case of automating the positioning of the bead 60 on the base and/or fabrication of the units. Materials that may be used in the practice of the invention for the beads are materials of the type taught in the EP Application and in U.S. Pat. Nos. 5,351,451 and 5,531,047. The disclosure of U.S. Pat. Nos. 5,351,451 and 5,531,047 are hereby incorporated by reference. As can be appreciated, the bead 60 may be continuous or in spaced segments along the inner surface 64 of the spacer frame or on any selected surfaces of the legs 30 and 32 of the spacer frame. Further, as can be appreciated, the amount of desiccant 62 in the bead 60 is not limiting to the invention; however, sufficient desiccant should be present to absorb the moisture in the compartment 28 but not reduce the adherence of the bead to the spacer frame. In the practice of the invention normally 40-60% of the total weight of the desiccant and matrix material is desiccant.

The spacer frame of the instant invention may be made of any material and configuration provided the spacer frame has resistance to torsional twist. Preferably, but not limiting to the invention, the spacer frame has structural stability to maintain the outer glass sheets 24 and 26 in spaced relationship to one another when biasing forces are applied to secure the unit 20 in a sash or a curtainwall system. Although the spacer frame of the instant invention may be made of any material e.g. wood, plastic, cardboard, compressed paper, metal e.g. stainless steel or aluminum, coated metals e.g. galvanized iron or tin coated steel, it is preferred in the practice of the invention that the spacer frame be made of metal and most preferably a low thermal conducting metal e.g. stainless steel, galvanized iron or tin coated steel such that the spacer frame has low thermal conductivity. More particularly in the practice of the invention the edge assembly of the unit which includes the spacer frame 22, the layers 46, the layer 50 (when present) and the bead 60 having the desiccant 62 (when present) has a low thermal conductivity or high RES-value determined as disclosed in U.S. Pat. No. 5,531,047.

Further, as can be appreciated, the spacer frame 22 is preferably made of a material that is moisture and/or gas impervious to prevent the ingress of environmental air into the compartment 28 and outgassing of the insulating gas from the compartment 28. Materials that are moisture and/or gas impervious that may be used in the practice of the invention, but not limited thereto, include metal e.g. galvanized steel, tin plated steel and stainless steel, halogenated polymeric material and/or spacer frames having a gas pervious core covered with an impervious film e.g. metal or polyvinylidene chloride film.

In regards to the edge assembly having a low thermal conductivity, a spacer frame made of aluminum conducts heat greater than a spacer frame made of metal coated steel e.g. galvanized or tin plated steel, a spacer frame made of metal coated carbon steels conducts heat greater than a spacer frame made of stainless steel, and a spacer frame made of stainless steel conducts heat greater than a spacer frame made of plastic. Plastics provide belter spacer frames from the standpoint of low thermal conductivity; however, metals are preferred for spacer frames because in many instances they are easier to shape and lend themselves more easily to automation than plastics and are less prone to outgassing.

In the discussion of the instant invention and in the claims, RES-value is defined as the resistance to heat flow of the edge assembly per unit length of perimeter. For a low thermal conducting edge of a multi-sheet unit of the instant invention, a RES-value of at least about 10 is acceptable, a value of at least about 50 is preferred and a RES-value of at least about 100 more preferred.

The discussion will now be directed to the features of the invention to reduce torsional twist. The degree of torsional twist is a term used to describe twist of an elongated piece e.g. a side of a spacer frame between adjacent corners or between ends of a spacer stock. By way of illustration, a side of a spacer frame having a 2 inch (5.08 cm) length may have one radian of twist. For each additional two inch length, the side of the spacer frame will have an incremental one radian of twist. Therefore for a side of a spacer frame 10 inches (25.4 cm) in length, the amount of torsional twist is 5 radians.

The amount of torsional twist is a function of the physical features of the cross sectional configuration of the spacer frame or spacer stock and the length of the side of the spacer frame under consideration or the length of the spacer stock under consideration. For example, for a spacer frame or spacer stock having a U-shaped cross section (see FIG. 2), the radian of bend is a function of the thickness of the base and the outer legs, the length of the side of the spacer frame, the height of the outer legs and the distance of the base between the outer legs. Increasing the height of the outer legs while keeping the other parameters constant decreases the degree of torsional twist and vice versa. Increasing the distance of the base between the outer legs while keeping the other parameters constant increases the degree of torsional twist and vice versa. Increasing the wall thickness of the upright legs while keeping the other parameters constant decreases the degree of torsional twist and vice versa. Increasing the length of the side of the spacer frame while keeping the other parameters constant increases the degree of torsional twist and vice versa. Increasing the thickness of the base while keeping the other parameters constant decreases the degree of torsional twist and vice versa.

Referring back to FIG. 2, the members 36 and 42, and end portions 44 of the outer legs 30 and 32 are shaped to a hair pin configuration to resist torsional twist. In the practice of the invention, the torsional twist of the outer legs 30 and 32 is a function of the thickness, height and length of the first member 36, the juncture 40, second member 42 and end portion 44 (hereinafter the "elements under discussion"). As the thickness increases and the height and length of the elements under discussion remains constant, the torsional twist decreases and vice versa, as the height of the elements under discussion increases and the thickness and length remain constant, the torsional twist increases and vice versa, and as the length of the side of the spacer frame increases and the thickness and height of the elements under discussion remain constant the torsional twist increases and vice versa. As can be appreciated, as the distance between the end portion 44 and the inner surface 64 of the base 34 of the spacer frame decrease (FIG. 2 shows the end portions 44 spaced from the inner surface 64; FIG. 3 shows the end portions 44 in contact with the inner surface 64), the torsional twist decreases because the end portions engage the inner surface of the base of the spacer frame resisting the torsional twist.

In general, a spacer frame made of 304 stainless steel and having outer legs including only the first member 36, each first member having a height of 0.250 inch (0.63 cm), a base 34 having a width of 0.254 inch (0.64 cm), and the base and first member having a thickness of 0.010 inch (0.025 cm) is expected to have about 0.166 T radians/inch of torsional twist for each inch of elongated side of the spacer frame or stock, where T is the applied torque in pound-inch. By way of example but not limiting to the invention, for 1040 steel the torsional twist is 0.145 T radians per inch. In the practice of the invention, for spacer stock made of 304 stainless steel, an end to end torsional twist (end to end torsional twist is the length of a side of a spacer frame or the length between ends of a piece of spacer stock) of less than 0.15 radian per inch (8.6 degrees per inch) is acceptable, 0.075 radians per inch (4.3 degrees per inch) is preferred and no twist or zero twist is most preferred. For stainless steel, a maximum twist of 0.23 radians per inch is acceptable, 0.115 radians per inch is preferred and zero twist is most preferred. As can be appreciated the above examples are presented for purposes of illustration and are not limiting to the invention. Acceptable twist for other metals and non metals can be determined by one skilled in the art from the above information.

In the practice of the invention, the torsional twist should not be of a magnitude to permanently deform the side of the spacer stock by allowing shear stress to exceed the yield point of the material of the spacer frame or buckle the sides e.g. legs 30 and 32 (see FIG. 2) of the spacer stock or spacer frame.

Referring back to FIG. 2, the members 36 and 42 are spaced from one another, and the end portion 44 spaced from the base to provide the spacer frame with a low thermal conducting path to provide the unit with a low thermal conducting edge. Referring to FIG. 3, spacer frame 70 has end portions 72 attached to second member 73 of outer legs 74 and 75 contact the inner surface 76 of base 77 of the spacer frame 70. All things being equal, except the location of the end portions 72 and 44, the spacer frame 70 of FIG. 3 does not have as low a thermal conducting path as the spacer frame 22 of FIG. 2 because the end portions 72 of the spacer frame 70 contact the inner surface 76 of the base 77, and therefore unit 78 shown in FIG. 3 will have a lower RES value and a higher conducting edge than the unit 20 shown in FIG. 2.

Figure 4:
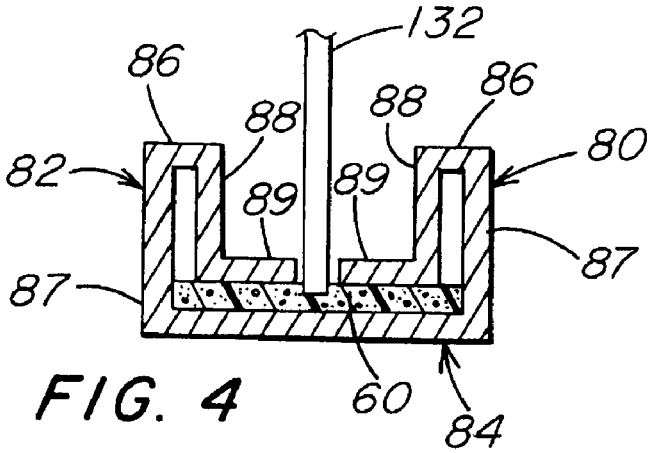
FIG. 4 is a view similar to the view of FIG. 3 having outer sheets and layers of sealant removed and an intermediate sheet within the spacer frame showing still another embodiment of the spacer frame of the invention to resist torsional twist.

The invention is not limited to the shape of the outer legs 30 and 32 of the spacer frame 22 and legs 74 and 75 of the spacer frame 70, and the outer legs may have any shape provided the shape resists torsional twist or reduces torsional twist. For example as shown in FIG. 4, outer legs 80 and 82 of spacer frame 84 have junctures 86 between the first members 87 and the second members 88 of the outer legs 80 and 82 flat instead of the radiused juncture 40 as shown in FIG. 2. Further, end portions 89 connected to second members 88 of the outer legs 80 and 82 are flat not radiused as are end portions 44 shown in FIG. 2.

Figure 5:
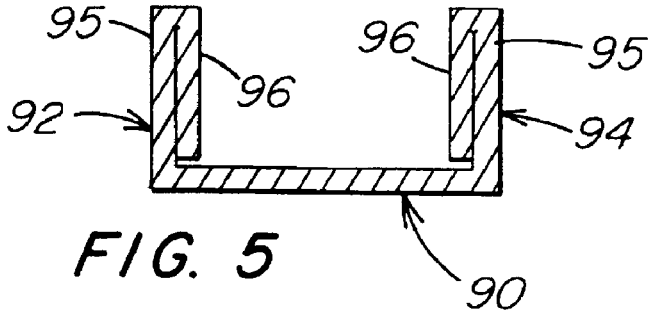
FIG. 5 is a view similar to the view of FIG. 4 having the intermediate sheet and adhesive containing desiccant removed showing a further embodiment of the spacer frame of the invention to resist torsional twist.
Figure 6:
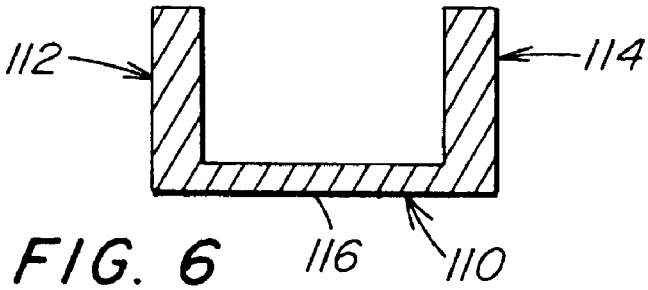
FIG. 6 is a view similar to the view of FIG. 5 showing still a further embodiment of the spacer frame of the invention to resist torsional twist.

With reference to FIG. 5, there is shown spacer frame 90. Outer legs 92 and 94 of the spacer frame 90 have the first members 95 and second members 96 in surface contact with one another. With reference to FIG. 6 there is shown spacer frame 110 having outer legs 112 and 114 formed of one piece and having a thickness greater than the thickness of base 116. For example but not limiting to the invention, the thickness of the legs 112 and 114 may be about 5 times the thickness of the base 116, preferably 3 times the thickness of the base 116 and most preferably 2 times the thickness of the base 116, to reduce the thermal conductivity of the spacer frame while providing resistance to torsional twist of a side of the spacer frame. As can be appreciated, the base may be made thicker than the legs to resist torsional twist; however, this arrangement provides less resistance to thermal conductivity.

In the practice of the invention the designs of the outer legs shown in FIGS. 2-4 are preferred because the first and second members are spaced from one another to provide a low thermal conducting path. The designs of the outer legs shown in FIGS. 2 and 4 are more preferred because in addition to providing a lower thermal conducting path than the design of the outer legs in FIG. 3, the bead 60 on the inner surface of the base of the spacer frame is mechanically held in position by the gap between the end portions and the inner surface of the base. In the instance where the material having the desiccant is an adhesive, the bead in addition to being held mechanically in position as previously discussed is also adhesively secured to the inner surface of the base. As can now be appreciated using the spacer frame designs shown in FIGS. 2 and 4, the bead 60 may be made of a non-adhesive porous material or an adhesive material having excessive amounts of desiccant e.g. greater than 60% by weight which adversely affects the adhesive property.

Most preferred in the practice of the invention is the spacer frame design shown in FIGS. 2 and 4 because in addition to the providing a mechanical securing arrangement for the bead 60, the end portions 44 (FIG. 2) and the end portions 89 (FIG. 4) are spaced from the inner surface of the base, and the first and second members are spaced from one another to provide a lower thermal conducting spacer frame than the design of the spacer frames shown in FIGS. 3, 5 and 6.

Figure 7:
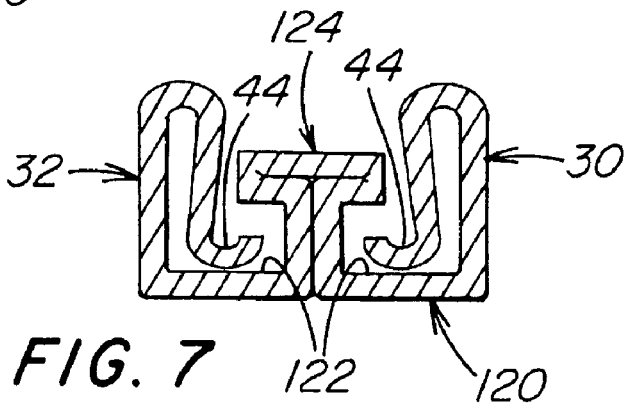
FIG. 7 is a view similar to the view of FIG. 5 showing another embodiment of the spacer frame of the invention to resist torsional twist.

As can now be appreciated, the spacer frame of the instant invention having strengthened outer legs to resist torsional twist may be used in combination with other techniques to resist torsional twist e.g. in combination with the strengthening member disclosed in U.S. patent application Ser. No. 08/529,180. Referring to FIG. 7, there is shown spacer frame 120 having outer legs 30 and 32 and the end portions 44 spaced from base 122. Strengthening member 124 has a generally T-shape cross section and is integral with the base 122. Further, as can be appreciated, the spacer frame of the invention may be used to fabricate triple glazed of the type disclosed in U.S. Pat. No. 5,531,047. For example, and with reference to FIG. 3, the bead 60 having the desiccant therein is provided with a groove 130 to receive peripheral and marginal edge portions of the intermediate sheet 132 which provides a compartment 134 between the sheets 26 and 132 and a compartment 136 between the sheets 24 and 132. The compartments 134 and 136 are similar in function to the compartment 28 shown in FIG. 2. Still further two spacer frames of the instant invention may be positioned between adjacent sheets to provide a triple glazed unit of the type shown in FIG. 20 of the EP Application.

The spacer frame of the instant invention having resistance to torsional twist may be formed to have continuous corners e.g. of the type disclosed in U.S. Pat. No. 5,351,451 or may be formed by joining ends of pieces or sections of spacer stock using corner keys or by welding as is known in the art of making multi-sheet insulating glazing units. As used herein, a continuous corner is a corner having at least the base of the spacer frame continuous (portions of the upright legs 30 and 32 may also be continuous) around selected corners of the spacer frame as contrasted to joining ends of sections of spacer stock together e.g. by corner keys or by welding.

The discussion will now be directed to forming a piece of spacer stock, and thereafter, forming a spacer frame, incorporating features of the invention.

Figure 8:
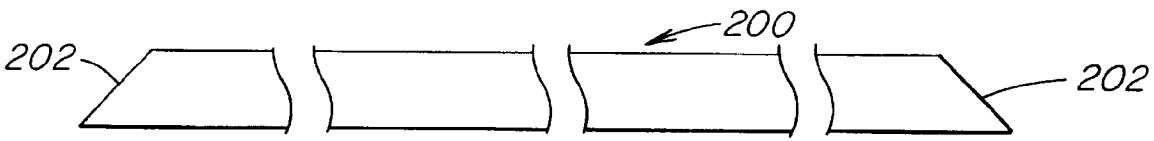
FIG. 8 is a side view of a section of spacer stock having features of the invention to resist torsional twist formed from the shaped strip shown in FIG. 9.

With reference to FIG. 8, there is shown spacer stock 200 having ends 202. The ends 202 of a plurality of spacer stocks 200 (only one spacer stock shown in FIG. 8) are joined in any convenient manner e.g. by welding, by corner keys or by an adhesive to form a spacer frame. More particularly, a plurality of spacer stocks 200 have their ends 202 angled or mitered so that when the ends 202 are joined together a closed spacer frame is formed e.g. the ends 202 have a 45° angle for forming a parallelepiped spacer frame, 54° angle for forming a pentagonal spacer frame. As can be appreciated, the ends of 202 may have a 90° angle and joined using corner keys.

Figure 9:
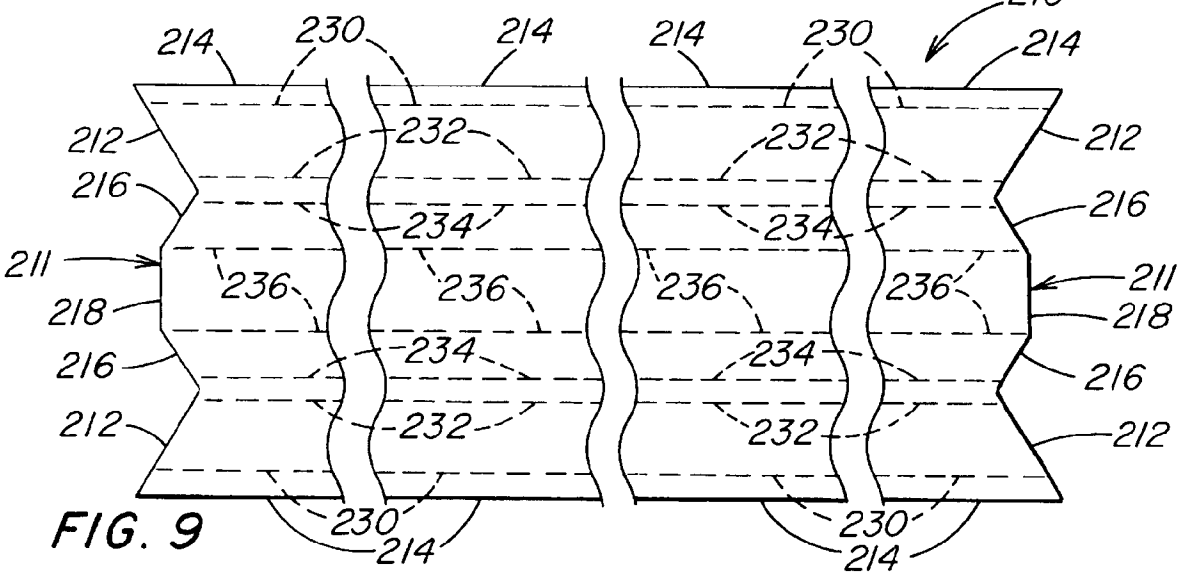
FIG. 9 is a plan view of a strip after punching and prior to forming into the section of the spacer stock shown in FIG. 8.

Although not limiting to the invention and with reference to FIGS. 8 and 9, one technique for forming the spacer stock 200 is to punch or shape a flat stainless strip in any usual manner to provide a punched strip 210 of the type shown in FIG. 9. The strip 210 has ends 211 having end portion 212 sloping inwardly from sides 214 of the strip, outwardly sloped end portion 216 connected at one end to the end portions 212 and at the other end to flat end portion 218. The sloped end portions 212 and 216 provide the mitered ends 202 after the strip 210 is shaped into the spacer stock 200. The strip 210 is bent e.g. by roll forming along imaginary lines 230 to form end portions 44 shown in FIG. 2, along imaginary lines 232 and 234 to form the juncture 40 joining the first member 36 and second member 38 of the outer legs 30 and 32 and along imaginary line 236 to form the portion 38 joining the first member of the outer legs to the base. The inner surface 64 of the base 34 is between imaginary lines 236. The spacer section 200 shown in FIG. 8 has the cross sectional configuration shown in FIG. 2. As can be appreciated, in the instance when the ends 202 of the spacer stock 200 shown in FIG. 8 has 90° ends, the ends 211 of the strip 210 shown in FIG. 8 are flat.

Another technique for making a spacer stock and/or a spacer frame incorporating features of the instant invention is to shape an elongated strip to provide one section of spacer stock having sufficient length to be bent to form a closed spacer frame. In the instant when the spacer frame has corners e.g. the spacer frame has a parallelepiped shapes the spacer frame has continuous corners, e.g. at least the base and optionally, portions of the outer legs are continuous, at at least one corner and preferably at at least three corners. Spacer frames of this type are disclosed in U.S. Pat. No. 5,351,451.

In the practice of the invention it is preferred to fabricate spacer frames having continuous corners. The invention will be discussed to fabricate a glazing unit similar to the unit 20 shown in FIG. 1 having a spacer frame having continuous corners.. Each of the outer sheets 24 and 26 are clear glass sheets having a length of about 42⅞ inches (108.9 cm) and a width of about 19¾ inches (50.17 cm). Each of the sheets has a thickness of about 0.090 inch (0.229 cm).

One of the glass sheets 24 or 26 is coated, and the coating is of the type sold by PPG Industries under its registered trademark Sungate® 100 coated glass. The coated surface of the sheet 24 or 26 faces the compartment 28.

Figure 10:
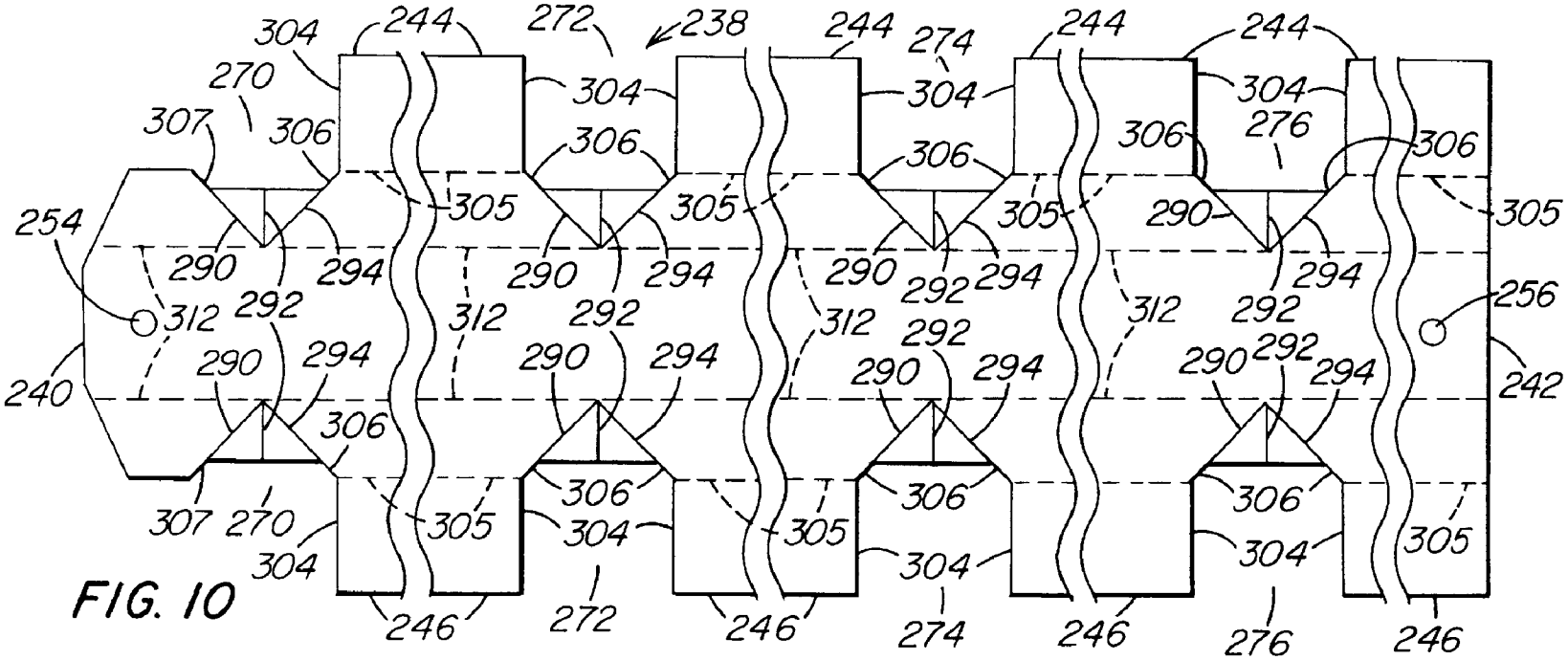
FIG. 10 is a plan view of a strip after punching and prior to forming into the spacer stock shown in FIG. 11.
Figure 11:
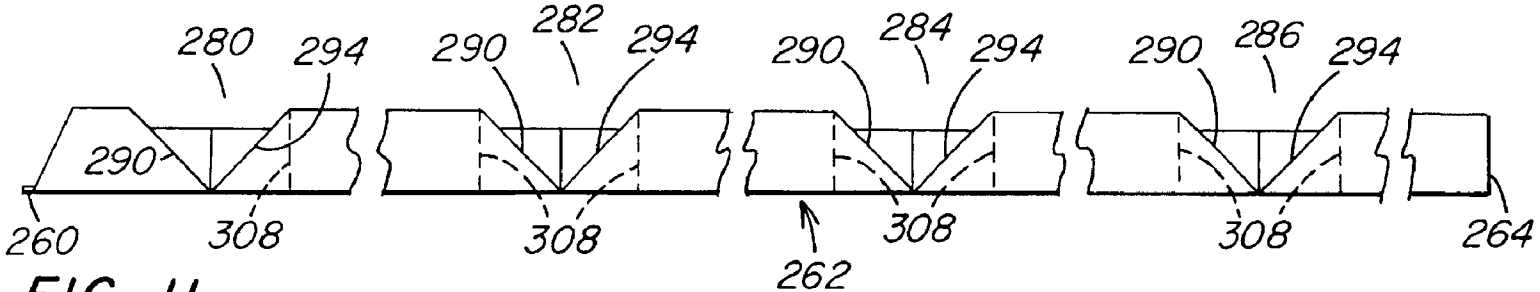
FIG. 11 is a side view of a spacer stock formed from the strip of FIG. 10 prior to bending to provide a spacer frame having continuous corners and having features of the invention to resist torsional twist.

With reference to FIGS. 10 and 11 as needed, a flat tin coated steel strip (not shown) is die cut to have the shape of strip 238 shown in FIG. 10. The strip 238 has a length of about 126 inches (320 cm) as measured between ends 240 and 242, a width of about 2.00 inches (5.08 cms) as measured between sides 244 and 246 and thickness of about 0.010 inch (0.25 mm). The end 240 of the strip 238 has a tapered end portion and a hole 254; the end 242 has a hole 256. Referring also to FIG. 11, the holes 254 and 256 (shown only in FIG. 10) are aligned after end 260 of spacer stock 262 of FIG. 11 is inserted into end 264 of the spacer stock 262 after the spacer stock 262 is formed into a spacer frame. Referring back to FIG. 10, locations spaced about 1.5 inches (3.8 cm), about 21⅛ inches (53.65 cm), about 63⅞ inches (162.24 cm), and about 83½ inches (212.09 cm) from the end 240, material is removed from the sides 244 and 246 to provide sets of pair of notches 270, 272, 274 and 276 respectively. The notched areas 270, 272, 274 and 276 form corner positions 280, 282, 284 and 286 respectively of the spacer stock 262 shown in FIG. 11 and corners of the spacer frame 22 shown in FIG. 1. Each of the notched areas include crease lines 290, 292 and 294 for bending portions of the outer legs bound by the crease lines 290, 292 and 294 inwardly toward one another at the corner when the spacer stock 262 is bent to form the spacer frame. The position of the portions of the upright legs between the crease lines is shown by numeral 296 in FIG. 2.

Each of the notched areas 272, 274 and 276 have vertical edges 304 as viewed in FIG. 10 starting at the sides 244 or 246 and extending toward the longitudinal center of the strip 250. At imaginary line 305, the straight edges 304 join sloping wall portions 306 that with the crease lines 290 and 294 have a "V" shape as shown in FIG. 10. The notches 270 have the sloping wall portions 306 and 307. As can be appreciated, the length of the slope 307 is sized in height to insert the end 260 into the end 264 of the spacer stock when forming the spacer frame. With reference to FIG. 11, after the strip 262 is shaped, the edges 304 are shown as dotted lines 308 and are short of the crease lines 290 and 294. In this manner when the spacer stock 262 is bent portions of the upright legs are easily moved inward without engaging the second leg 42 (see FIG. 2) of the outer legs. As can be appreciated the side portion 304 can be at any angle relative to its adjacent edge 244 or 246. Each of the edges 304 including its respective crease lines has a length of about 0.350 inch (0.89 cm), which is approximately equal to the height of a second leg 42 and the radiused end 44 of the outer legs 30 or 32 of the spacer frame 22 as viewed in FIG. 2. The radiused end 44 and juncture 30 each have a radius of about 0.125 inch (0.32 cm). The distance between imaginary lines 312, i.e. the distance between the V-shaped crease lines is about 0.500 inch (1.27 cm) to provide a base having a distance of 0.500 inch (1.27 cm) between outer legs. It can be appreciated that the strip 210 shown in FIG. 9 has more imaginary lines than the strip 238 shown in FIG. 10 for purposes of clarity and that the strip 238 may be bent along similar imaginary lines to provide the cross section shown in FIG. 2.

The strip 238 is shaped in any convenient manner to provide the spacer stock 262 shown in FIG. 11 having the cross section shown in FIG. 2. After the spacer stock 262 is formed, the bead 60 of H. B. Fuller HL-5102-X-125 butyl hot melt matrix having the desiccant 62 is extruded onto the inner surface 64 of the base 34 (see FIG. 2).

The adhesive-sealant layers 46 are extruded onto the outer surface 48 of the outer legs 30 and 32. The adhesive-sealant of the layers 46 may be of the type sold as H. B. Fuller 1191 hot melt butyl. The layers 46 have an applied thickness of about 0.040 inch (0.010 cm) and a height of about 0.250 inch (0.32 cm) to provide a layer 46 having a thickness of about 0.020 inch (0.05 cm) and a height of about 0.300 inch (0.08 cm) after the glass sheets are pressed against the outer legs.

As can be appreciated, the bead 60 having the desiccant 62 may be extruded onto the base of the spacer stock before, after, or during the extrusion of the layers 46 onto the outer surface 48 of the legs 30 and 32, and the bead 60 may be applied and/or the layers 46 may be applied during or after the strip 238 (FIG. 10) is formed into the spacer stock 262 (FIG. 11).

The spacer stock 262 is bent at the corner portions 284 and 286, at the corner portion 282 and thereafter at the corner portion 280 while the tapered end 260 is telescoped into the end 264 of the spacer stock 262 to form the spacer frame having continuous corners.

The holes 254 and 256 are aligned with each other and may be sealed with polyisobutylene, and/or joined with a close end rivet or screw. The outer glass sheets 24 and 26 are thereafter positioned over the layer 46 and biased toward one another to flow the layer 46 to secure the outer glass sheets to the legs 30 and 32 of the spacer frame. Thereafter the sealant-adhesive 50 is flowed into the channel formed by the marginal edge portions of the outer sheets 24 and 26 and the outer surface 52 and base 34 of the spacer frame 22.

Figure 12:
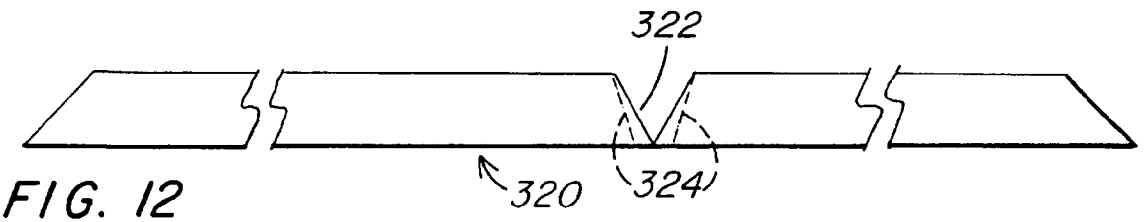
FIG. 12 is a view similar to the view shown in FIG. 11 having a continuous base and features of the invention to resist torsional twist.

With reference to FIG. 12, there is shown another embodiment of the spacer stock of the instant invention. Spacer stock 320 of FIG. 12 has "V" shape cut outs at expected corner 322. With this arrangement there are no portions of the sidewalls bent over the base as was discussed for the spacer stock 262 of FIG. 11. Also in FIG. 12 there is shown by dotted line designated by numeral 324, the end of the second member of the outer legs terminating short of the first member of the outer legs. As can now be appreciated, the spaced distance between the first and second members at expected corners of the spacer frame is not limiting to the invention.

As can now be appreciated, the embodiments of the invention present are for purposes of illustration only and are not limiting to the invention and other embodiments are contemplated by the invention and within the scope of the claimed invention.

What is claimed is:

[1. An elongated spacer stock used in the manufacture of a spacer frame to separate sheets of an insulating unit, the spacer stock comprising:

an elongated base;

a first elongated leg having a first member and a second member joined together to have a generally U-shaped cross section;

a second elongated leg having a first member and a second member joined together to have a generally U-shaped cross section; wherein the first and second legs are spaced from and out of contact with one another and joined to the base to provide a generally U-shaped cross section with open end of the U formed by the first and second legs and base in a first direction, the U shape of the first leg open in a second direction, and the U-shape of second leg open in the second direction with the first and second directions opposite to one another, and the first and second legs spaced from and out of contact with one another.]

[2. The spacer stock of claim 1 wherein the first member of the first and second legs is joined to the second member of the first and second legs by a radiused portion.]

[3. The spacer stock of claim 2 wherein the first and second members of the first and second legs are spaced from one another.]

[4. The spacer stock of claim 3 wherein the end of the second member of the first and second legs is radiused.]

[5. The spacer stock of claim 4 wherein the radiused end of the second member of the first and second legs contacts surface of the base between the first and second legs.]

6. [The] *An elongated* spacer stock [of claim 4] *used in the manufacture of a spacer frame to separate sheets of an insulating unit, the spacer stock comprising:*

*an elongated base;*

*a first elongated leg having a first member and a second member joined together to have a generally U-shaped cross section;*

*a second elongated leg having a first member and a second member joined together to have a generally U-shaped cross section;*

*wherein the first members of the first and second legs are joined to the base to provide the spacer stock with a generally U-shaped cross section, wherein an open end of the U formed by the first and second legs and the base is open in a first direction, the U-shaped cross section of the first leg open in a second direction, and the U-shaped cross section of the second leg open in the second direction with the first and second directions opposite to one another;*

*wherein the first and second legs are spaced from and out of contact with one another;*

*wherein the first and second members of the first leg are spaced from and out of contact with one another; the first and second members of the second leg are spaced from and out of contact with one another; the second member of the first and the second legs are spaced from one another, and the first and second legs are connected to one another only by the base to provide only one thermal conducting path from the first leg to the second leg, and* wherein *the end of the second member of the first and second legs is radiused, and* the radiused end of the second [member] *members* of the first and second [member] *legs* are spaced from the *inner* surface of the *elongated* base between the first and second legs.

[7. The spacer stock of claim 1 wherein the first and second members of each of the first and second legs are in contact with one another.]

[8. An elongated spacer stock used in the manufacture of a spacer frame to separate sheets of an insulating unit, the spacer stock comprising:

a base:

a first leg connected to the base; and a second leg connected to the base and spaced from the first leg, wherein the legs and the base are connected to provide a generally U-shaped cross-section, wherein the first and second legs have a thickness greater than the thickness of the base to reduce torsional twist of the spacer stock.]

9. [The] *An elongated* spacer stock [of claim 1] *used in the manufacture of a spacer frame to separate sheets of an insulating unit,* wherein the spacer stock [has] *comprises:* a continuous *elongated* base*;*

*a first elongated leg having a first member and a second member joined together to have a generally U-shaped cross section;*

*a second elongated leg having a first member and a second member joined together to have a generally U-shaped cross section;*

*wherein the first members of the first and second legs are joined to the base to provide the spacer stock with a generally U-shaped cross section with an open end of the U formed by the first and second legs and the base open in a first direction, the U-shaped cross section of the first leg open in a second direction, and the U-shaped cross section of the second leg open in the second direction with the first and second directions opposite to one another;*

*wherein the first and second legs are spaced from and out of contact with one another, and*

*wherein the first and second members of the first leg are spaced from and out of contact with one another; the first and second members of the second leg are spaced from and out of contact with one another; the second member of the first and the second legs are spaced from one another; the first and second legs are connected to one another only by the base to provide only one thermal conducting path from the first leg to the second leg,* and portions of the second member *of the first and second legs* are removed at positions along the spacer stock that form corners when the spacer stock is bent into [a] *the* spacer frame.

10. The spacer stock of claim 9 wherein the first member *of the first and second legs* at corners [has weaking] *have crease* lines arranged to have a generally "V" shape.

11. The spacer stock of claim 9 wherein the first member *of the first and the second legs* has a cut out portion at the positions along the spacer stock that form corners when the spacer stock is bent into [a] *the* spacer frame.

12. [The] *An elongated* spacer stock [of claim 1] *used in the manufacture of a spacer frame to separate sheets of an insulating unit, the spacer stock comprising:*

*an elongated base,* wherein the base has a "T" shaped cross section [extending];

*a first elongated leg having a first member and a second member joined together to have a generally U-shaped cross section;*

*a second elongated leg having a first member and a second member joined together to have a generally U-shaped cross section;*

*wherein the first members of the first and second legs are joined to the base to provide the spacer stock with a generally U-shaped cross section with an open end of the U formed by the first and second legs and the base open in a first direction, the U-shaped cross section of the first leg open in a second direction, and the U-shaped cross section of the second leg open in the second direction with the first and second directions opposite to one another;*

*wherein the first and the second legs are spaced from and out of contact with one another;*

*wherein the first and second members of the first leg are spaced from and out of contact with one another; the first and second members of the second leg are spaced from and out of contact with one another; the second member of the first and the second legs are spaced from one another, and the first and second legs are connected to one another only by the base to provide only one thermal conducting path from the first leg to the second leg, and*

*wherein the "T" shaped cross section of the base extends* upwardly between the first and second legs, and is spaced from and out of contact with the first and second legs.

13. A *closed* spacer frame for separating sheets of an insulating unit, the *closed* spacer frame comprising:

a base *defining perimeter of the closed spacer frame*;

a first leg connected to the base, the first leg *defining a side of the spacer frame and* having a first member and a second member joined together to have a generally U-shaped cross section *wherein the first member and the second member of the first leg are spaced from one another*;

a second leg connected to the base, the second leg *defining an opposite side of the spacer frame and* having a first member and a second member joined together to have a generally U-shaped cross section *wherein the first member and the second member of the second leg are spaced from one another*; wherein the first and second legs are spaced from and out of contact with one another and connected to the base to provide the spacer frame with a generally U-shaped cross section with *an* open end *of the U-shaped cross section of the spacer frame* facing in a first direction and opening of [U] *the U-shaped cross section* of the first and second legs facing in a second direction opposite to the first direction to reduce torsional twist, *and the first and second legs are connected to one another only by the base to provide only one thermal conducting path from the first leg to the second leg.*

14. The *closed* spacer [stock] *frame* of claim 13 wherein the first member *of the first and second legs* is joined to the second member *of the first and second legs* by a radiused portion.

15. The *closed* spacer [stock] *frame* of claim 14 wherein the first and second legs each include:

[a] *the* first member *of the first and the second legs* joined to [a] *the* second member *of the first and the second legs, respectively* to have a generally hairpin configuration with the first member *of the first and the second legs* joined to the base.

16. The *closed* spacer [stock] *frame* of claim 15 wherein:

the end of the second member *of the first and second legs* is radiused, and the radiused end of the second member *of the first and second legs* is out of contact with the base.

17. The *closed* spacer frame of claim 13 wherein the spacer frame has corners and the base is continuous around the corners of the spacer frame.

18. The *closed* spacer frame of claim 17 wherein [the] portions of the [outer] *first and second* legs are bent toward one another over the base.

19. The *closed* spacer frame of claim 18 wherein portions of the second member *of the first and second legs* are removed at the corners and *the portions of the first and second legs bent toward one another over the base are* portions of the first member [are bent over the base] *of the first and second legs*.

20. The *closed* spacer frame of claim 16 wherein a bead of moisture pervious material having a desiccant is deposited on the surface of the base between the first and second legs defined as inner surface of the base, and the bead having portions between the radiused end of the second member of the first and second legs and the inner surface of the base.

[21. An insulating unit comprising:

a pair of sheets;

a spacer frame between the pair of sheets, and the spacer frame comprising:

a base;

a first leg a second leg; wherein the first and second legs are spaced from and out of contact with one another and joined to the base to provide the spacer frame in cross section with a generally U-shaped cross section with the open end of the U facing a first direction and the first and second legs each including a first U-shaped member having two ends, one end attached to the base and the remaining end joined by a radiused portion to the second member such that the members form a generally U-shaped cross-sectional configuration with the opening of the U facing a second direction opposite to the first direction to reduce torsional twist, and means for securing the sheets to the spacer frame.]

[22. The insulating unit of claim 21 wherein the securing means include a moisture impervious sealant securing the sheets to the first and second legs of spacer frame.]

[23. The insulating unit of claim 20 further including a bead of a moisture pervious material having a desiccant mounted on surface of the base between the first and second legs.]

[24. The insulating unit of claim 21 wherein the first and second legs each include:

a first member joined to a second member to have a generally hairpin configuration with the first member joined to the base and the second member having an end positioned relative to the base.]

[25. The insulating unit of claim 24 wherein the first member is joined to the second member by a radiused portion.]

26. [The] *An* insulating unit [of claim 25] *comprising:*

*a pair of sheets;*

*a spacer frame between the pair of sheets, the spacer frame comprising:*

*a base;*

*a first leg*

*a second leg;*

*wherein the first and second legs are spaced from and out of contact with one another and joined to the base to provide the spacer frame in cross section with a generally U-shaped cross section with an open end of the U-shaped cross section facing a first direction and the first and second legs each including a first member having two ends, one end attached to the base and the remaining end joined by a radiused portion to a second member such that the second member has an end positioned relative to the base and the first and the second members form a generally U-shaped cross-sectional configuration with an opening of the U-shaped cross-sectional configuration facing a second direction opposite to the first direction to reduce torsional twist, and the first and second legs are connected to one another only by the base to provide only one thermal conducting path from the first leg to the second leg, and* wherein[:] the first and second members are spaced from one another to provide the first and second legs with a hairpin cross sectional configuration; the end of the second member is radiused, and the radiused end is spaced from and out of contact with the base*, and*

*means for securing the sheets to the spacer frame.*

27. The insulating unit of claim 26 wherein the spacer frame has corners and the base is continuous around the corners.

[28. The insulating unit of claim 23 wherein the bead is between the ends of the second member and the inner surface of the base.]

[29. The insulating unit of claim 28 wherein the bead is a moisture pervious adhesive.]

[30. The insulating unit of claim 29 wherein the unit has a low thermal conducting edge.]

[31. The insulating unit of claim 29 further including a sheet mounted between the legs within the frame.]

[32. A method of making and using a spacer stock comprising the steps of:

providing a strip of bendable material and shaping the strip to provide an elongated piece of spacer stock having a base, a first leg and a second leg, the base and legs joined to provide the spacer stock with a generally U-shaped cross section with the U open in a first direction and the first and second legs spaced from one another and out of contact with one another, and the legs each having a first member joined to a second member to have a U-shaped cross section with the opening of the U in a second direction opposite to the first direction to reduce torsional twist of the spacer stock.]

33. [The] *A* method [set forth in claim 32 further including] *of making and using a spacer stock comprising* the steps of:

*providing a strip of bendable material;*

*shaping the strip to provide an elongated piece of spacer stock having a base, a first leg and a second leg, the base and legs joined to provide the spacer stock with a generally U-shaped cross section with the U-shaped cross section open in a first direction and the first and second legs spaced from one another and out of contact with one another, and the legs each having a first member joined to and spaced from a second member to have a U-shaped cross section with an opening of the U-shaped cross section of the first and second legs open in a second direction opposite to the first direction to reduce torsional twist of the spacer stock and the first and second legs connected to one another only by the base to provide only one thermal conducting path from the first leg to the second leg;* identifying corner positions on the elongated piece of spacer stock;

removing portions of the second member *of the first and second legs* at the corner positions, and bending the spacer stock at the corner positions to provide a spacer frame.

34. The method as set forth in claim 33 further including the step of:

securing a sheet to outer surface of each of the legs to provide an insulating unit.

* * * * *